(12) United States Patent
Gall

(10) Patent No.: US 12,007,525 B2
(45) Date of Patent: Jun. 11, 2024

(54) METAL DETECTOR

(71) Applicant: Minelab Electronics Pty. Limited, Mawson Lakes (AU)

(72) Inventor: Liam Ronald Cameron Gall, Mawson Lakes (AU)

(73) Assignee: Minelab Electronics Pty. Limited, Mawson Lakes (AU)

( * ) Notice: Subject to any disclaimer, the term of this patent is extended or adjusted under 35 U.S.C. 154(b) by 300 days.

(21) Appl. No.: 17/602,471

(22) PCT Filed: Apr. 17, 2020

(86) PCT No.: PCT/AU2020/000034
§ 371 (c)(1),
(2) Date: Oct. 8, 2021

(87) PCT Pub. No.: WO2020/210859
PCT Pub. Date: Oct. 22, 2020

(65) Prior Publication Data
US 2022/0206179 A1 Jun. 30, 2022

(30) Foreign Application Priority Data
Apr. 18, 2019 (AU) ................................ 2019901361

(51) Int. Cl.
*G01V 3/15* (2006.01)
*F16B 7/14* (2006.01)

(52) U.S. Cl.
CPC . *G01V 3/15* (2013.01); *F16B 7/14* (2013.01)

(58) Field of Classification Search
None
See application file for complete search history.

(56) References Cited

U.S. PATENT DOCUMENTS

| | | | | |
|---|---|---|---|---|
| 3,947,140 | A * | 3/1976 | Thomas | A61H 3/02 403/379.5 |
| D756,247 | S | 5/2016 | Pollock et al. | |
| 2006/0091888 | A1* | 5/2006 | Holman | G01V 3/15 340/551 |
| 2009/0009173 | A1 | 1/2009 | Loubet | |
| 2016/0231448 | A1 | 8/2016 | Andel | |

FOREIGN PATENT DOCUMENTS

DE 4318563 A1 12/1994

* cited by examiner

*Primary Examiner* — Jas A Sanghera
(74) *Attorney, Agent, or Firm* — The Webb Law Firm

(57) ABSTRACT

A body for a handheld metal detector includes a lower end configured to engage with a sensor head; an upper end including an armrest connected to an upper shaft element; and a grip element intermediate to the lower end and the upper end, the grip element including a grip portion configured to allow a user to hold the body, and a first retaining means for slidably retaining the upper shaft element such that the distance between the armrest and the grip element is able to be adjusted.

16 Claims, 4 Drawing Sheets

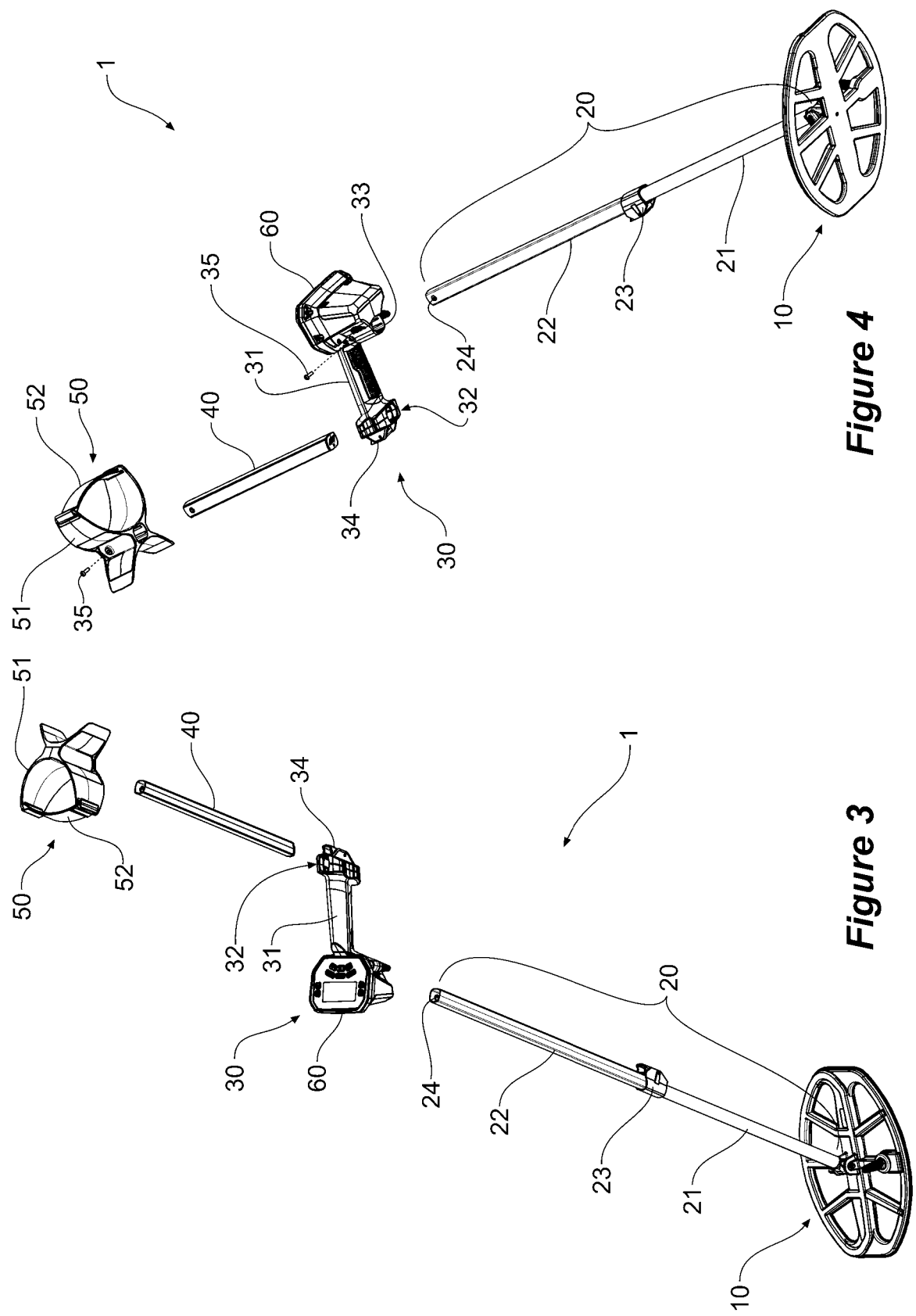

METAL DETECTOR

CROSS-REFERENCE TO RELATED APPLICATIONS

This application is the United States national phase of International Application No. PCT/AU2020/000034 filed Apr. 17, 2020, and claims priority to Australian Provisional Patent Application No. 2019901361 filed Apr. 18, 2019, the disclosures of which are hereby incorporated by reference in their entirety.

BACKGROUND OF THE INVENTION

Field of the Invention

The present disclosure relates to a metal detector. In a particular form, the present disclosure relates to a body for a metal detector.

Description of Related Art

A typical metal detector assembly comprises a detection head which houses various metal detecting elements, and a body, which allows a user to be able to stand in an upright position and move the detection head close to the ground. The body will typically feature a grip element which allows the operator to grasp the body with one hand, and an armrest with an adjustable cuff and strap, which engages with the forearm of the operator.

With operators sometimes using metal detectors for extended periods of time, ergonomics are an important consideration. Another important consideration is the need for a product that is able to be reduced in size for storage and/or transport.

Two known body configurations are the "S rod" configuration, where the grip element forms part of an s-shaped profile, and the "straight rod" configuration, where the grip element extends from the straight rod configuration.

It is against this background that the present disclosure has been developed.

SUMMARY OF THE INVENTION

According to a first aspect, there is provided a body for a handheld metal detector, the body comprising a lower end configured to engage with a sensor head, an upper end comprising an armrest, and a grip element intermediate to the lower end and the upper end, the grip element comprising a grip portion configured to allow a user to hold the body, wherein the distance between the armrest and the grip element is able to be adjusted.

In one form, the armrest is connected to an upper shaft element and the grip element comprises a first retaining means for slidably retaining the upper shaft element.

In one form, the first retaining means is in the form of an aperture through which the upper shaft element locates.

In one form, the first retaining means further comprises a first locking means for selectively locking the position of the shaft element with respect to the grip element.

In one form, the armrest is connected to an upper end of the shaft element, and a lower end of the shaft element is configured to be slidably retained by the first retaining means.

In one form, the lower end of the body comprises a lower shaft element configured to engage with the sensor head.

In one form, the lower end of the upper shaft element is configured to telescopically receive the lower shaft element.

In one form, the grip element further comprises a second retaining means for fixedly retaining the lower shaft element.

In one form, the first and second retaining means of the grip element are positioned either side of the grip portion such that the lower shaft element and the upper shaft element extend in a spaced apart relationship with each other, such that the body has an s-shape configuration.

According to a second aspect, there is provided a metal detector comprising a sensor head, and a body comprising a lower end configured to engage with the sensor head, an upper end comprising an armrest connected to a shaft element, and a grip element intermediate to the lower end and the upper end, the grip element comprising a grip portion configured to allow a user to hold the body, and a first retaining means for slidably retaining the shaft element such that the distance between the armrest and the grip element is able to be adjusted, wherein the metal detector is capable of changing between an s-shape configuration and a straight rod configuration.

BRIEF DESCRIPTION OF DRAWINGS

Embodiments of the present invention will be discussed with reference to the accompanying drawings wherein:

FIG. 3 is a rear exploded perspective view of the metal detector as shown in FIG. 1;

FIG. 4 is a front exploded perspective view of the metal detector as shown in FIG. 1;

DESCRIPTION OF THE INVENTION

Figure 1:
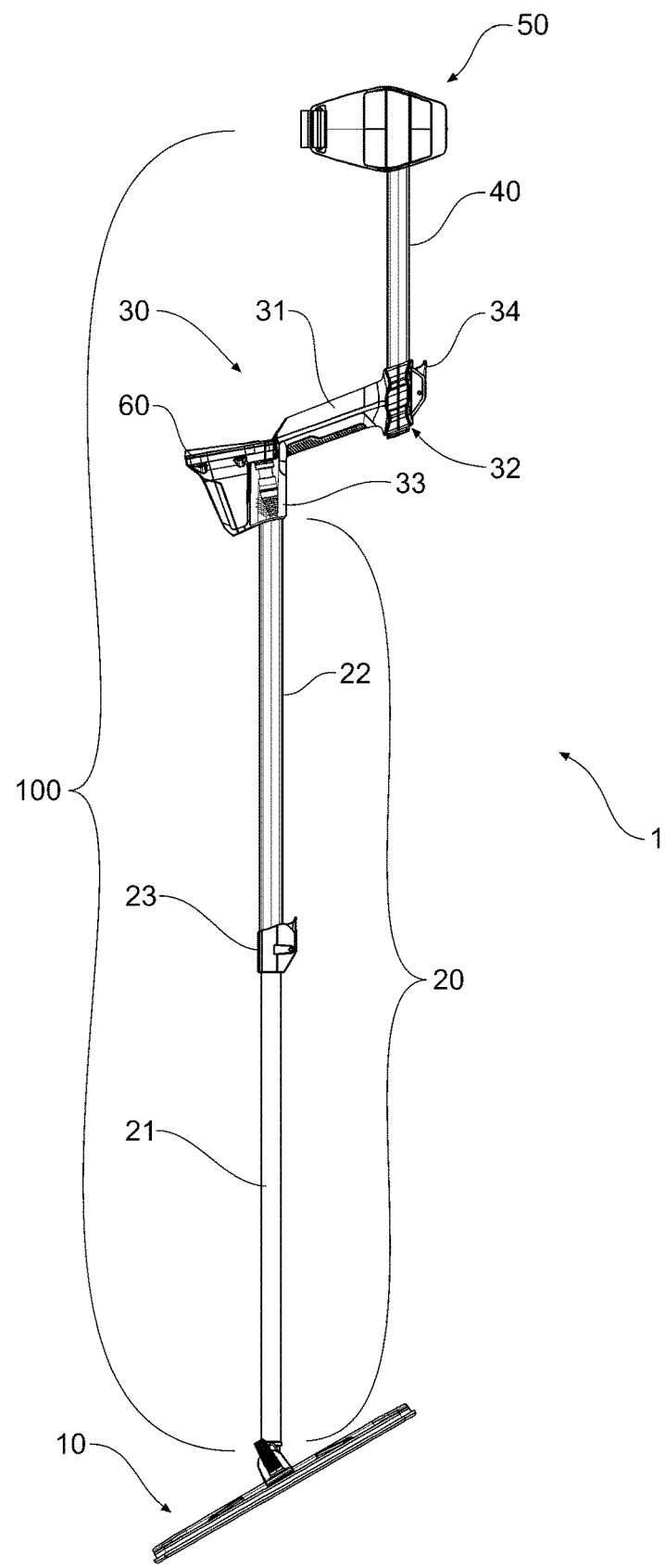
FIG. 1 is a side view of a metal detector, in a first configuration, in an extended state.

In this specification, unless specified otherwise, terms such as "lower", "upper" etc are relative terms and not absolute. Generally, the relative terms are to be understood based on the perspective of the operator when the operator is holding the hand-held metal detector in front with the arm holding the metal detector shaft extending forward away from the body. Thus, in this position, a sensor head of a metal detector is closer to the ground and considered to be at a "lower" portion and a grip element for holding the metal detector is further away from the ground, thus at an "upper" portion.

Referring to FIGS. 1 to 5 there is shown a metal detector 1, comprising a detector head or sensor head 10 and a body 100. The body 100 comprises a lower end configured to engage with the detector head 10, an upper end comprising an armrest 50, and a grip element 30 intermediate to the lower end and the upper end, the grip element 30 comprising a grip portion 31 configured to allow a user to hold the body, wherein the distance between the armrest 50 and the grip element 30 is able to be adjusted.

The armrest 50 is connected to an upper shaft element 40, and as can be seen in FIGS. 3 and 4, the grip element 30 comprises a first retaining means 32 for slidably retaining the upper shaft element 40.

Figure 2:
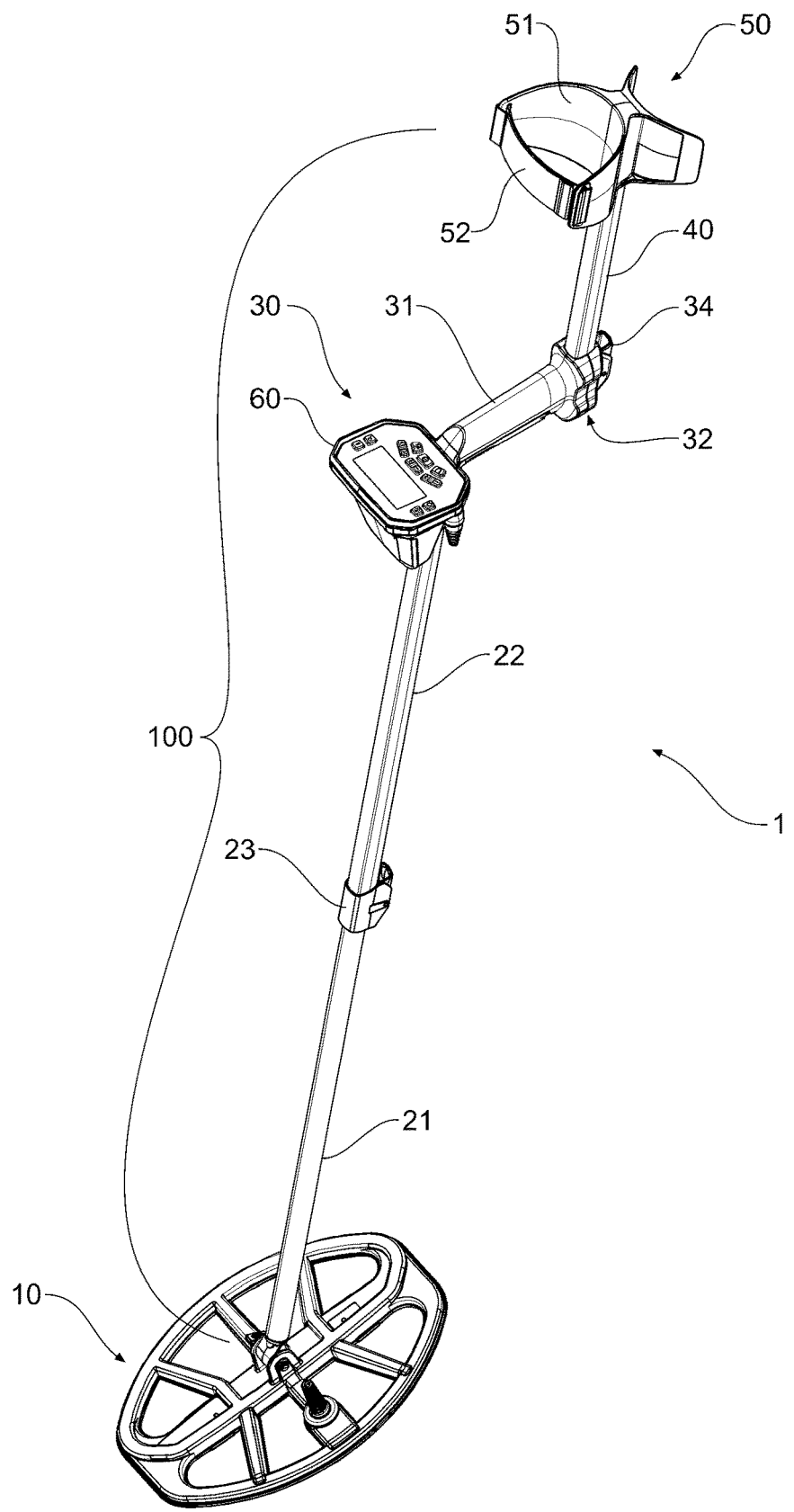
FIG. 2 is a rear perspective view of the metal detector as shown in FIG. 1.

The first retaining means is in the form of an aperture 32, through which the upper shaft element 40 locates. It can also be seen that the first retaining means 32 comprises a locking means in the form of a latch 34 for selectively locking the position of the upper shaft element 40 with respect to the grip element 30, such that the distance between the armrest 50 and the grip element 30 is able to be adjusted. The upper shaft element 40 and the aperture 32 both have the same non-circular cross section, sized and configured to prevent or at least reduce the shaft element 40 twisting relative to the grip element 30. Referring now to FIGS. 2 to 4 it can be seen that the armrest 50 is connected to an upper end of the upper shaft element 40, and a lower end of the upper shaft element 40 is configured to be slidably retained by the first retaining means 32. The armrest 50 comprises an adjustable cuff 51 and strap 52 configured to wrap around an operator's arm when in use.

It will be appreciated that by virtue of the adjustability of the distance between the armrest 50 and the grip element 30, that the distance can be finely adjusted to suit the length of the operator's arm.

While in the embodiment shown, the distance between the armrest 50 and the grip element 30 is able to be adjusted by virtue of the first retaining means 32 and the upper shaft element 40, it will be appreciated alternative means for adjusting the distance may be possible. For instance, the upper shaft element 40 may itself be extendable, or alternatively, the upper shaft element 40 may be fixedly secured to the grip element 30 and the armrest 50 is adjustably secured to the upper shaft 40.

Referring now to FIGS. 3 and 4 it can also be seen that the grip element 30 further comprises a second retaining means 33 for fixedly retaining a lower shaft element 20, wherein the lower shaft element 20 is configured to engage with the sensor head 10. The sensor head 10 is connected to the lower shaft element 20 in a rotatable manner, such that the sensor head 10 can be folded against the lower shaft element 20 for storage.

It can be seen that the lower shaft element 20 features a first and second portion 21, 22, wherein the first portion 21 (connected to sensor head 10) is configured to telescopically slide within the second portion 22 (connected to the grip element 30). The lower shaft element 20 further comprises a second locking means 23 configured to selectively lock the first portion 21 relative to the second portion 22, such that the overall length of the lower shaft element 20 is able to be slidably adjusted. It can be seen that the first and second portions 21, 22 have hollow cross sections. They are sized and configured to prevent or at least reduce the two portions twisting relative to each other, for example, anti-rotation feature may be included.

It will be appreciated that by virtue of the adjustability of the length of the lower shaft element 20, that the length can be adjusted to suit the height of the operator. Furthermore, as shown in FIG. 5, it will also be appreciated that it allows for the overall length of the metal detector 1 to be reduced for storage.

Referring to FIG. 4, it can be seen that the second portion 22 of the lower shaft element 20 is fixedly connected to the grip element 30 via the second retaining means, in the form of an aperture 33 configured to receive the second portion 22 of the lower shaft element 20, where the second portion 22 is fixedly secured to the grip element 30 via a fastener in the form of a bolt 35 screwed in to a threaded insert 24 in the second portion 22. It will however be appreciated that any suitable fastening arrangement may be applied. The aperture 33 has the same non-circular cross section as the second portion 22, where they are sized and configured to prevent or at least reduce the lower shaft element 20 twisting relative to the grip element 30. The first and second retaining means 32, 33 of the grip element 30 are positioned either side of the grip portion 31 such that the lower shaft element 20 and the upper shaft element 40 extend in a spaced apart relationship with each other, with the grip portion 31 bridging the two shaft elements 20, 40 such that the body 100 has an s-shape configuration.

Figures 5, 6:
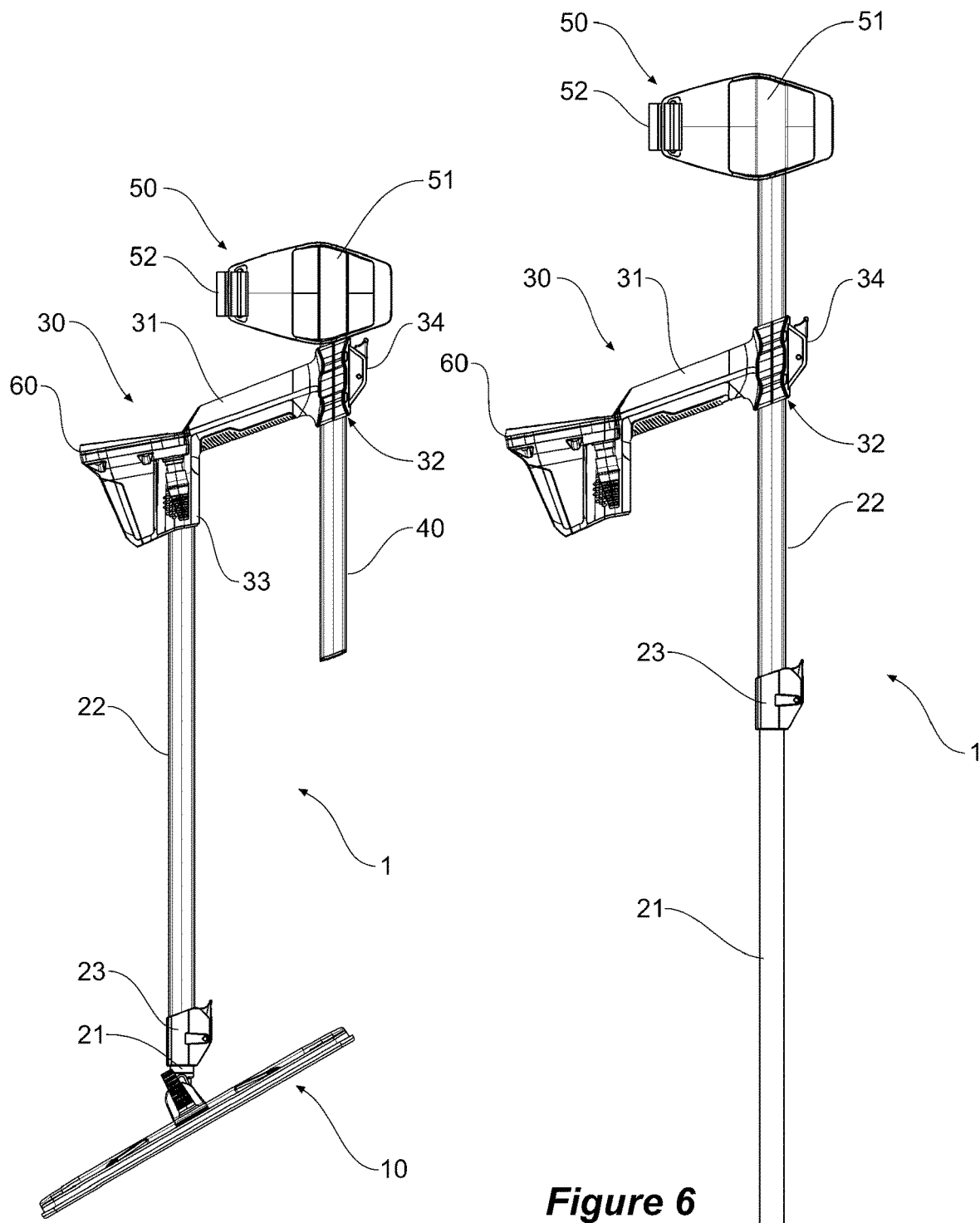
FIG. 5 is a side view of the metal detector as shown in FIG. 1, in a collapsed state.
FIG. 6 is a side view of the metal detector, in a second configuration, in an extended state.

Referring now to FIG. 6 where the metal detector 1 is shown in an alternate or "straight rod" configuration. It can be seen that in this configuration, instead of the armrest 50 being secured to the upper shaft 40, it is secured to the second portion 22 of the lower shaft element 20. The second portion 22 is then located through the first retaining means aperture 32, such that the grip portion 31 extends away from the shaft element 20, and, first portion 21 of the lower shaft element is telescopically received by the second portion 22 such that the two shaft elements extend substantially collinearly. It will be appreciated that in this configuration, the distance between the armrest 50 and the grip element 30 and the overall length of the metal detector 1 is still able to be slidably adjusted by virtue of the locking means 34 acting upon the second portion 22, and the second locking means 23 respectively.

It will be appreciated that the second retaining means aperture 33 in the grip element 30 not being utilised in this configuration, may be left open, or it may be covered by an end cap or the like.

As shown in both embodiments, the grip element 30 also comprises a control module 60, which comprises elements such as a user interface, speaker(s), batteries, processor and means for connecting to the sensor head 10.

It will be appreciated that the above disclosure describes a body suitable for use with a metal detector, which is capable of being employed in either an S rod or a straight rod configuration. This is useful from an operator preference perspective, for instance, one metal detector may be used by more than one operator, where each operator may have different configuration preferences. Furthermore, the body is configured to allow the armrest to slidably move relative to the grip element, such that the distance between the armrest and the grip element is able to be slidably adjusted. This is useful from an ergonomic perspective, allowing the position of the armrest to be slidably adjusted to the length of the operator's arm. It is also useful in that the armrest is able to be collapsed against the grip element, reducing the length of the metal detector for storage and/or transport.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgment of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. A body for a handheld metal detector, the body comprising:
    a lower end configured comprising a lower shaft element to engage with a sensor head;
    an upper end comprising an armrest connected to an upper shaft element; and
    a grip element intermediate to the lower end and the upper end, the grip element comprising a grip portion configured to allow a user to hold the body, a first aperture for slidably retaining the upper shaft element such that the distance between the armrest and the grip element is able to be adjusted, and a second aperture for retaining the lower shaft element such that the lower shaft element and the upper shaft element extend in a spaced apart relationship with each other such that the body has an s-shape configuration.

2. The body as claimed in claim 1, wherein the first aperture further comprises a first locking means for selectively locking the position of the upper shaft element with respect to the grip element.

3. The body as claimed in claim 1, wherein the armrest is connected to an upper end of the upper shaft element, and a lower end of the upper shaft element is configured to be slidably retained by the first aperture.

4. The body as claimed in claim 1, wherein the first aperture and second aperture are positioned either side of the grip portion.

5. The body as claimed in claim 1, wherein the second aperture fixedly retains the lower shaft element with respect to the grip element.

6. The body as claimed in claim 1, wherein the lower shaft element and the upper shaft element extend in a spaced apart parallel relationship with each other.

7. The body as claimed in claim 1, wherein the lower shaft element extends from the grip element in a first direction and the armrest extends from the grip element in a second direction.

8. The body as claimed in claim 7, wherein the distance between the armrest and the grip is able to infinitely adjusted between a minimum length and a maximum length, where at the minimum length, the upper shaft is moved to a position where distance that the armrest extends from the grip in the second direction is minimised and a lower end of the upper shaft extends away from the grip in the first direction, and where at the maximum length, the upper shaft is moved to a position where the distance that the armrest extends away from the grip in the second direction is maximised and the lower end of the upper shaft is adjacent the grip.

9. A metal detector comprising:
    a sensor head; and
    a body comprising:
        a lower end comprising a lower shaft element configured to engage with the sensor head;
        an upper end comprising an armrest connected to an upper shaft element; and
        a grip element intermediate the lower end and the upper end, the grip element comprising a grip portion configured to allow a user to hold the body, a first aperture for slidably retaining the upper shaft element such that the distance between the armrest and the grip element is able to be adjusted, and a second aperture for retaining the lower shaft element such that the lower shaft element and the upper shaft element extend in a spaced relationship with each other such that the body has an s-shape configuration.

10. The metal detector as claimed in claim 9, wherein the first aperture further comprises a first locking means for selectively locking the position of the upper shaft element with respect to the grip element.

11. The metal detector as claimed in claim 9, wherein the armrest is connected to an upper end of the upper shaft element, and a lower end of the upper shaft element is configured to be slidably retained by the first aperture.

12. The metal detector as claimed in claim 9, wherein the first aperture and second aperture are positioned either side of the grip portion.

13. The metal detector as claimed in claim 9, wherein the second aperture fixedly retains the lower shaft element with respect to the grip element.

14. The metal detector as claimed in claim 9, wherein the lower shaft element and the upper shaft element extend in a spaced apart parallel relationship with each other.

15. The metal detector as claimed in claim 9, wherein the lower shaft element extends from the grip element in a first direction and the armrest extends from the grip element in a second direction.

16. The metal detector as claimed in claim 15, wherein the armrest and the grip is able to infinitely adjusted between a minimum length and a maximum length, where at the minimum length, the upper shaft is moved to a position where distance that the armrest extends from the grip in the second direction is minimized and a lower end of the upper shaft extends away from the grip in the first direction, and where at the maximum length, the upper shaft is moved to a position where the distance that the armrest extends away from the grip in the second direction is maximized and the lower end of the upper shaft is adjacent the grip.

* * * * *